United States Patent
Bonica et al.

(10) Patent No.: US 8,364,949 B1
(45) Date of Patent: Jan. 29, 2013

(54) AUTHENTICATION FOR TCP-BASED ROUTING AND MANAGEMENT PROTOCOLS

(75) Inventors: Ron P. Bonica, Sterling, VA (US); Andrew H. Heffernan, San Mateo, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1786 days.

(21) Appl. No.: 11/357,704

(22) Filed: Feb. 17, 2006

Related U.S. Application Data (60) Provisional application No. 60/732,049, filed on Nov. 1, 2005.

(51) Int. Cl.
*H04L 29/06* (2006.01)
(52) U.S. Cl. ...................................................... 713/153
(58) Field of Classification Search .................. 713/152, 713/153, 168; 709/223, 225; 726/1
See application file for complete search history.

(56) References Cited

U.S. PATENT DOCUMENTS

| | | | | |
|---|---|---|---|---|
| 6,154,775 | A  * | 11/2000 | Coss et al. | 709/225 |
| 6,757,822 | B1 * | 6/2004 | Feiertag et al. | 713/152 |
| 2002/0099663 | A1 * | 7/2002 | Yoshino et al. | 705/65 |
| 2002/0152382 | A1 * | 10/2002 | Xiao | 713/173 |
| 2003/0046532 | A1 * | 3/2003 | Gast | 713/151 |
| 2004/0034773 | A1 * | 2/2004 | Balabine et al. | 713/168 |
| 2005/0021474 | A1 * | 1/2005 | Geist et al. | 705/63 |
| 2005/0198250 | A1 * | 9/2005 | Wang | 709/223 |
| 2006/0021003 | A1 * | 1/2006 | Fisher et al. | 726/1 |
| 2007/0005973 | A1 * | 1/2007 | Mynam et al. | 713/171 |

FOREIGN PATENT DOCUMENTS

JP 20065613 A * 1/2006

OTHER PUBLICATIONS

JP 2006-5613 A, English translation of abstract, Published Date Jan. 5, 2006.*

* cited by examiner

*Primary Examiner* — William Goodchild
(74) *Attorney, Agent, or Firm* — Shumaker & Sieffert, P.A.

(57) ABSTRACT

A new Transmission Control Protocol (TCP) Enhanced Authentication Option is described. An administrator configures sending and receiving devices to maintain lists of authentication elements for each protected TCP connection. Each authentication element includes an authentication element identifier, a key, a hash algorithm, and a start time. A sending device calculates a security portion, updates the new TCP option to include the security portion, calculates a checksum, and forwards the TCP segment to the receiving device. Having received the authenticated TCP segment, the receiving device scans its list of authentication elements, searching for an authentication element whose identifier matches that of the incoming TCP option. If the receiving device finds such an authentication element, the receiving device uses a key from the authentication element to calculate a security portion. If the calculated security portion matches the security portion received in the incoming TCP segment, the receiving device accepts the segment.

31 Claims, 5 Drawing Sheets

AUTHENTICATION FOR TCP-BASED ROUTING AND MANAGEMENT PROTOCOLS

This application claims the benefit of U.S. Provisional Application No. 60/732,049, filed Nov. 1, 2005, the entire content of which is incorporated herein by reference.

TECHNICAL FIELD

The invention relates to computer networks and, more particularly, to security within computer networks.

BACKGROUND

Mechanisms that secure border gateway protocol (BGP) sessions using message-digest algorithm 5 (MD5) authentication have been proposed. Specifically, a Transmission Control Protocol (TCP) MD5 Signature Option has been proposed that can be appended to each Transmission Control Protocol (TCP) header. The MD5 Signature Option contains a 16-byte MD5 digest, i.e., a security portion, that serves as authentication data for the TCP segment. The MD5 digest is calculated over the following fields: the TCP pseudo-header; the TCP header, excluding options, and assuming a checksum of zero; the TCP segment data (if any); and an independently-specified key or password, known to both communicating TCP modules.

To spoof a connection using the scheme described above, an attacker would not only have to guess TCP sequence numbers, but would also have had to obtain the password included in the MD5 digest. This password never appears in the connection stream, and the actual form of the password is determined by the application.

However, synchronization of the keys at both ends of the TCP connection is often challenging, and updating keys associated with active TCP sessions typically requires dismantling those TCP sessions active between the sending and receiving device. These limitations have proven to be significant deterrents to the deployment of the TCP MD5 Signature Option for BGP.

SUMMARY

In general, the invention is directed to techniques of authenticating segments in Transmission Control Protocol (TCP)-based routing and management protocols between devices. In particular, an administrator may configure a first and a second network device to respectively store a plurality of authentication elements (e.g., a "chain" of authentication elements) for each protected TCP-based connection between the devices. The first and the second network devices use the stored authentication elements to authenticate individual segments in a TCP-based routing or management protocol.

For example, an administrator may install copies of a plurality of authentication elements on a first and a second network device. These network devices communicate using a TCP-based routing or management protocol, such as Border Gateway Protocol (BGP). When the first network device sends a segment in the TCP-based protocol, the first network device generates a security portion for the segment based on an authentication element selected from the plurality of authentication elements. The first device then sends the segment to the second network device along with the security portion and an identifier of the selected authentication element. Upon receiving the segment, the second network device uses the identifier to retrieve a copy of the authentication element from its plurality of authentication elements. Should the second network device retrieve the copy of the authentication element identified by the received identifier, the second network device may use the copy of the authentication element to generate a security portion for the segment. If the generated security portion and the received security portion do not match or the second network device is unable to retrieve the identified copy of the authentication element, the second network device rejects the segment.

In one embodiment, a method comprises selecting, with a sending network device, an authentication element from a plurality of authentication elements associated with a network connection, wherein each of the authentication elements is associated with an authentication element identifier, a key, a security algorithm, and a start time, wherein the first network device stores the plurality of authentication elements, and wherein a second network device stores a copy of the selected authentication element. The method also comprises generating a security portion for a network segment associated with the network connection by applying the security algorithm and the key associated with the selected authentication element to at least a portion of the network segment. In addition the method comprises outputting via the network connection the network segment to a receiving device, wherein the network segment includes the security portion for authenticating the sending device and the identifier of the selected authentication element used to calculate the security portion.

In another embodiment, a method comprises storing within a receiving device a plurality of authentication elements for each of a plurality of protected network connections, wherein each authentication element includes an authentication element identifier, a key, a hash algorithm, and a start time. The method further comprises receiving, with the receiving device, a network segment from a sending device through one of the protected network connections, wherein the network segment includes a security portion and an authentication element identifier. The method also comprises using the authentication element identifier to select one of the authentication elements from the plurality of authentication elements associated with the protected network connection through which the network segment was received. In addition, the method comprises generating at the receiving device a second security portion for the network segment by applying the security algorithm and the key associated with the selected authentication element to a portion of the received network segment. Further, the method comprises accepting the network segment when the second security portion matches the security portion received in the network segment.

In another embodiment, a network device comprises an authentication element repository to store a plurality of authentication elements for a protected network connection, wherein each of the authentication elements is associated with an authentication element identifier, a key, a hashing algorithm, and a start time. The network device also comprises an authentication element selection module to select an authentication element from the plurality of authentication elements in the authentication element repository associated with the network connection. In addition, the method comprises a security portion generation module to generate a security portion for a network segment by applying a hashing algorithm associated with the selected authentication element to a portion of the network segment and a key associated with the selected authentication element. The device network device also comprises a segment assembly module to generate the network segment that includes the security portion and an authentication element identifier associated with the selected authentication element. In addition, the network device comprises a forwarding element to output the network segment generated by the segment assembly module to a receiving device.

In another embodiment, a computer-readable medium contains instructions. The instructions cause a programmable processor to configure a sending device and a receiving device to store respective lists of authentication elements for each of a plurality of protected Transmission Control Protocol (TCP) connections, wherein each of the authentication elements includes an authentication element identifier, a key, a hashing algorithm, and a start time. The instructions further cause the processor to select an authentication element from the lists, wherein the selected authentication element has a start time less than or equal to a current time, and calculate a security portion for a TCP segment using the selected authentication element. In addition, the instructions cause the processor to forward the TCP segment from a sending device to a receiving device, wherein the TCP segment includes the security portion for authenticating the sending device and includes the authentication element identifier used to calculate the security portion.

In another embodiment, the invention is directed to a computer-readable medium containing instructions. The instructions cause a programmable processor to receive, with a first network device, a network segment from a second network device through a TCP connection, wherein the network segment includes a security portion and an authentication element identifier associated with an authentication element in a plurality of authentication elements stored on the second device. The instructions also cause the processor to use the authentication element identifier to select a copy of the authentication element from a plurality of authentication elements stored on the first device. In addition, the instructions cause the processor to generate a security portion for the network segment by applying a hashing algorithm associated with the selected copy of the authentication element to a portion of the network segment and to a key associated with the selected copy of the authentication element. Further, the instructions cause the processor to accept the network segment when the generated security portion matches the security portion received in the network segment.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
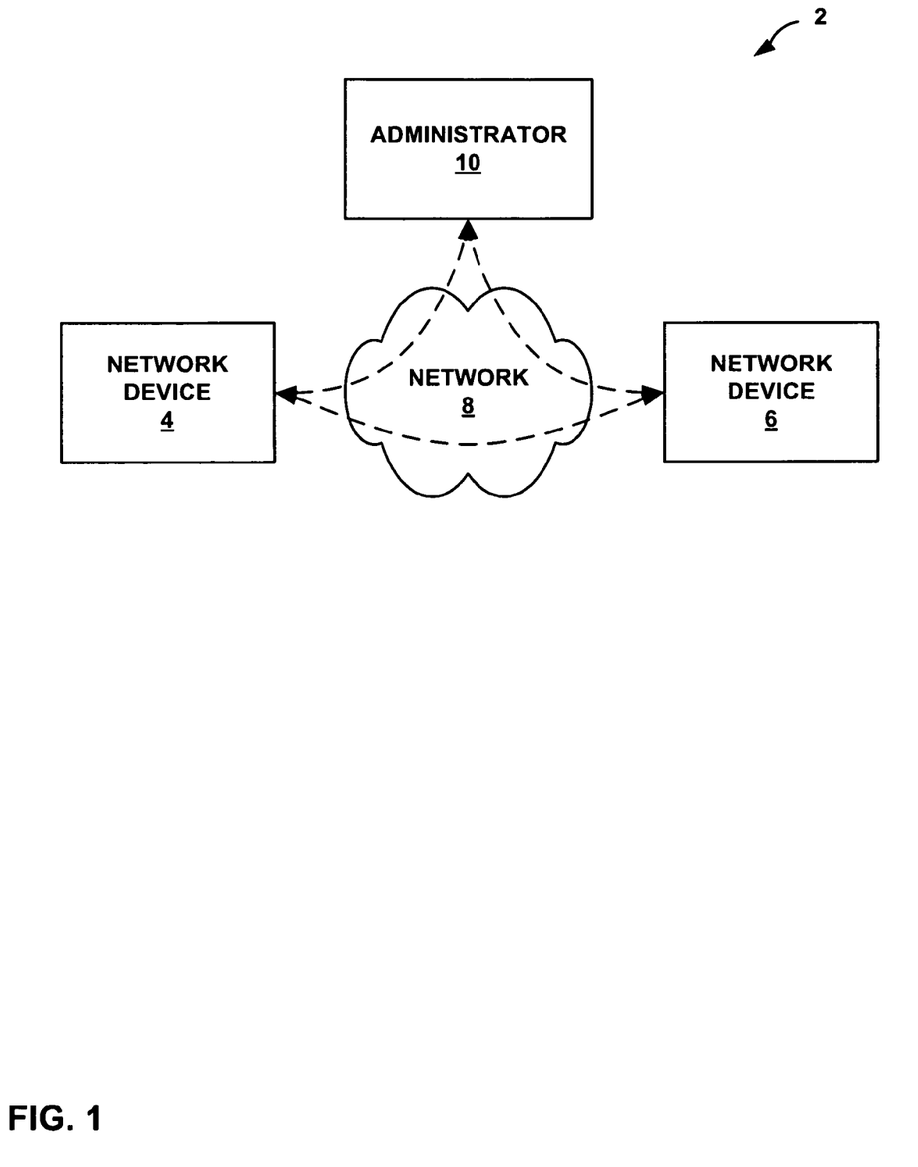
FIG. 1 is a block diagram illustrating an exemplary system in which a first network device and a second network device use the principles of this invention to authenticate segments in a Transmission Control Protocol (TCP)-based routing and management protocol.

FIG. 1 is a block diagram illustrating an exemplary system 2 in which a first network device 4 and a second network device 6 uses the principles of this invention to authenticate segments received on protected network connections between the devices. As illustrated in FIG. 1, network device 4 communicates with network device 6 through a network 8.

Network 8 may be a public or a private network. For instance, network 8 may be the Internet, a local area network, a wide-area network, and so on. Moreover, connections within network 8 may be wired or wireless and may consist of any network communication medium.

For exemplary purposes, the techniques will be described with respect to Transmission Control Protocol (TCP)-based routing and management protocol. In this exemplary embodiment, network devices 4, 6 communicate exchange routing information via the BGP routing protocol using one or more TCP connections in which each TCP segment includes a message authentication code (MAC), referred to generally herein as a security portion.

In general, it is assumed that devices and connections in network 8 are not secure. Consequently, a malicious user of network 8 may attempt to attack a targeted node by mimicking or "spoofing" segments from a trusted node. In particular, the malicious user may create segments that appear to be from a trusted node, but are not actually from the trusted node. Such mimic attacks may cause a targeted node in network 8 to behave in an undesired way.

Because network 8 is not necessarily secure against mimic attacks, network device 4 and network device 6 may use a TCP Enhanced Authentication Option to help prevent mimic attacks. In particular, an administrator 10 may configure network device 4 to store a plurality of authentication elements for each protected TCP connection between network device 4 and network device 6. In addition, administrator 10 configures network device 6 to also store copies of the authentication elements.

Each authentication element in the plurality of authentication elements is associated with an authentication element identifier, a start time, a key, and an identifier of a security algorithm. For example, an authentication element may be a software object that includes the identifier, the start time, the key, and the identifier of the security algorithm. The authentication element identifier may comprise an integer between 1 and 255. Moreover, the integer comprising an authentication element identifier is unique within a series of authentication elements. The "start time" of an authentication element is also unique within the series of authentication elements. The security algorithm may be a hashing algorithm, and different authentication elements may be associated with different hashing algorithms. Thus, a first one of the authentication elements may be associated with a different hashing algorithm than a second one of the authentication elements. For example, an authentication element may be associated with a hashing algorithm such as the Message-Digest Algorithm 5 (MD5) that produces a security portion as a cryptographic message digest.

Whenever a network device, e.g., network device 4, needs to transmit data on a protected TCP connection, network device 4 selects an authentication element from a plurality of authentication elements for the protected TCP connection. For example, network device 4 may select an authentication element from the plurality of authentication elements that is associated with a "start time" that is less than or equal to the current time. If multiple authentication elements have a "start time" that is less than or equal to the current time, network device 4 selects the authentication element with the latest "start time." Because administrator 10 installs copies of authentication elements on network device 4 and network device 6, network device 6 also stores the selected authentication element.

After selecting the authentication element from the plurality of authentication elements, network device 4 generates a security portion using the selected authentication element and a portion of the TCP segment. For example, network device 4 may generate a message digest (referred to herein as a "security portion") by applying a hashing algorithm associated with the selected authentication element to a portion of the network segment and a key associated with the selected authentication element.

Having generated the security portion, network device 4 creates a new TCP Enhanced Authentication Option that includes the security portion. The TCP Enhanced Authentication Option may include a "type" field, a length field, an authentication element identifier, and the security portion. The "type" field identifies the TCP option as a TCP Enhanced Authentication Option. The length field signals the length of the security portion. The authentication element identifier of the TCP Enhanced Authentication Option identifies which authentication element network device 4 used to calculate the security portion.

After creating the TCP Enhanced Authentication Option, network device 4 includes the option as an option in an authenticated TCP segment. Because the TCP Enhanced Authentication Option includes the authentication element identifier and the security portion, the TCP segment includes all information necessary for network device 6 to authenticate network device 4 as the sender of the TCP segment. Subsequently, network device 4 may output the authenticated TCP segment to network device 6.

When network device 6 receives the TCP segment, network device 6 obtains a copy of the necessary authentication element using the authentication element identifier contained in the authenticated TCP segment. For example, network device 6 may search its copy of the plurality of authentication elements for a copy of an authentication element whose identifier matches the identifier specified by the incoming TCP Enhanced Authentication Option. If network device 6 finds such a copy of an authentication element, network device 6 uses the key and the hashing algorithm from that authentication element to calculate a security portion. If the calculated security portion matches the security portion received in the incoming TCP Enhanced Authentication Option, network device 6 accepts the segment. Otherwise, if the digests do not match or network device 6 cannot find the specified authentication element, network device 6 may declare an authentication failure and discard the authenticated TCP segment. To reduce the risk that a malicious user could discover the key, network device 6 does not generally produce a response back to the network device 4 when there is an authentication failure.

This invention may present one or more advantages. For example, suppose that network device 4 and network device 6 are routers. Further suppose that network device 4 and network device 6 may communicate routing information using one or more Border Gateway Protocol (BGP) sessions. As is well known in the art, BGP uses TCP as a transport layer protocol. In this situation, administrator 10 may apply the principles of this invention to change, delete, or add any authentication element other than the current authentication element without dismantling and rebuilding the BGP sessions. This provides administrator 10 with the advantage of being able to maintain the security of the keys in the authentication elements without disrupting BGP communication between network device 4 and network device 6. This may enhance the likelihood that administrator 10 will freely update keys in the authentication elements. Ultimately, this may translate to greater network security.

The principles of this invention may also reduce the computational complexity of authenticating TCP-based routing and management protocols. For example, according to the principles of this invention, a receiving network device, e.g., network device 6, uses an authentication element identifier to find a matching authentication element. Use of an authentication element identifier to find a matching authentication element is simpler than attempting to find a matching authentication element using start time alone. Because use of an authentication element identifier is simpler, a receiving network device is less vulnerable to network attacks that proceed by causing the receiving network device to perform a great number of unnecessary calculations. Furthermore, the clocks on the communicating network devices need not be synchronized because it is possible that only the sending network device uses a clock to select an authentication element.

Figure 2:
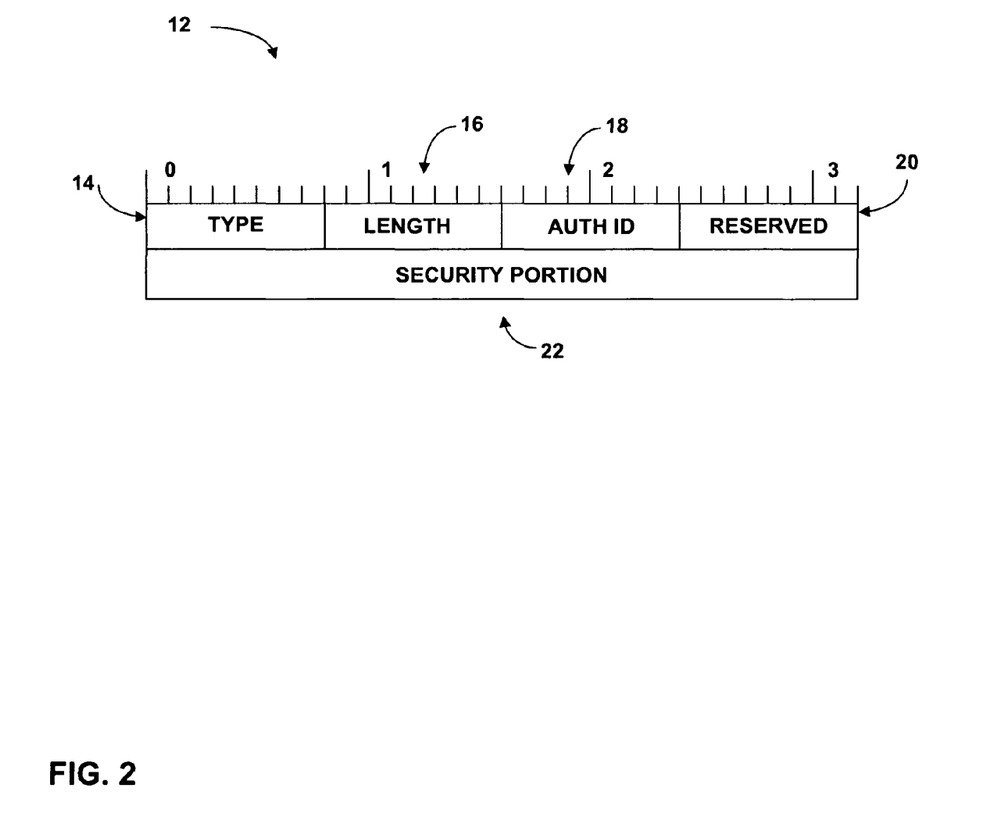
FIG. 2 is a block diagram illustrating an exemplary format of a TCP Enhanced Authentication Option.

FIG. 2 is a block diagram illustrating an exemplary format of a TCP Enhanced Authentication Option 12. TCP Enhanced Authentication Option 12 comprises a Type field 14, a length field 16, an authentication element identifier field 18, a reserved field 20, and a security portion field 22. In TCP Enhanced Authentication Option 12, Type field 14 is an eight-bit number that identifies TCP Enhanced Authentication Option 12 as a TCP Enhanced Authentication Option. The Internet Assigned Numbers Authority (IANA) may assign the value of Type field 14. Length field 14 is an eight-bit number that specifies the length of the TCP Enhanced Authentication Option, in octets. This value includes the two octets representing the Type and Length fields. Authentication element identifier field 18 is an eight-bit number that identifies the authentication element that a sending network device used to generate the security portion. In this exemplary format, reserved field 20 is an eight-bit number that is always equal to zero. Security portion field 22 serves as authentication data for a TCP segment.

The length of the security portion, and therefore, the length of the entire option, is determined by the hashing algorithm. For instance, if the hashing algorithm comprises Message Digest Algorithm 5 (MD5), the security portion is sixteen octets in length. In contrast, Secure Hash Algorithm-224 produces a security portion that is twenty-eight octets in length. Thus, if MD5 is used, length field 14 equals sixteen (0b00001000).

Figure 3:
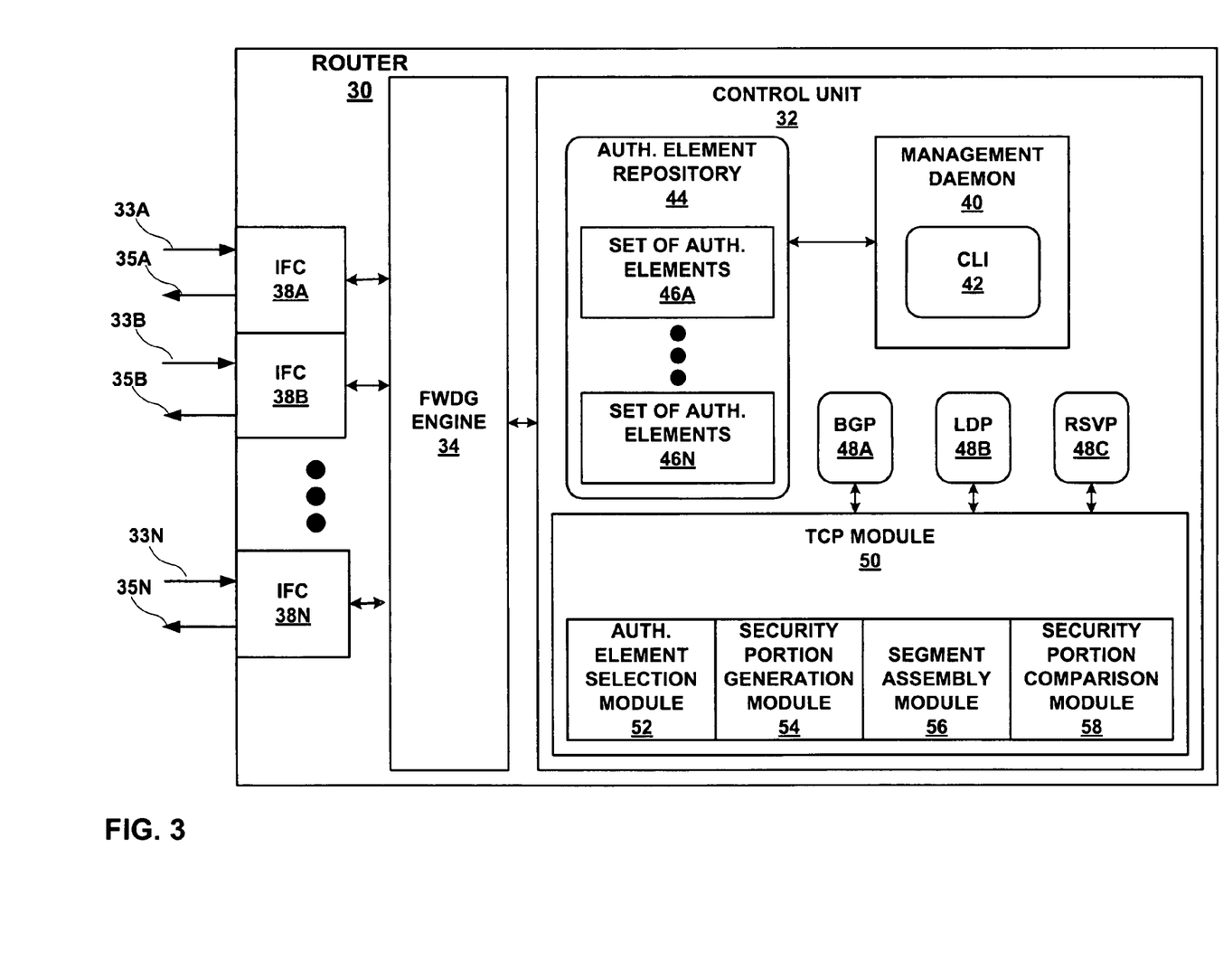
FIG. 3 is a block diagram illustrating an example embodiment of a router consistent with the principles of the invention.

FIG. 3 is a block diagram illustrating an example embodiment of a router consistent with the principles of the invention. Referring to FIG. 1, network device 4 and network device 6 may comprise routers as shown in FIG. 3. Router 30 may be a sending router or a receiving router. Router 30 includes a control unit 32 and a forwarding engine (FWDG ENGINE) 34. Forwarding engine 34 directs inbound packets received through interface cards (IFCs) 38A-38N from inbound link 33A-33N to the appropriate outbound link 35A-35N.

Control unit 32 contains a management daemon 40 that presents a command line interface (CLI) 42 to a user, e.g., administrator 10. Control unit 32 further contains an authentication element repository 44. Authentication element repository 44 may contain sets of authentication elements 46A through 46N (collectively, sets of authentication elements 44). Administrator 10 may remove a set of authentication elements, e.g., set of authentication elements 46A, in authentication element repository 44 and replace it with a new set of authentication elements, e.g., set of authentication elements 46N. In addition, administrator 10 may replace individual authentication elements within a set of authentication elements. For example, administrator 10 may access a router 30 via CLI 38, create a new set of authentication elements 46N, and name the new set of authentication elements. Administrator 10 may then add a new authentication element to the new set of authentication elements. Subsequently, administrator 10 may access a second router and configure the second router with the same set of authentication elements. So long as administrator 10 does not change the authentication element currently being used, administrator 10 may configure sets of authentication elements 44 without dismantling a protected TCP connection.

Control unit 32 may provide an operating environment for routing and management protocols modules 48A through 48N (collectively, routing protocol modules 48). As illustrated in FIG. 3, routing protocol modules 48 may include BGP module 48A, Label Distribution Protocol (LDP) module 48B, and Resource Reservation Protocol (RSVP) module 48C. In general, routing protocol modules 48 create routing protocol data. For instance, BGP module 48A creates BGP data. When one of routing protocol modules 48 is prepared to send routing protocol data to a second router over a TCP connection, the routing protocol module delivers the routing protocol data to a TCP module 50.

TCP module 50 comprises an authentication element selection module 52, a security portion generation module 54, a segment assembly module 56, and a security portion comparison module. When TCP module 50 receives routing protocol data associated with a TCP connection from one of routing protocol modules 48, TCP module 50 uses authentication element selection module 52 to select an authentication element from a set of authentication elements in an authentication element repository associated with the TCP connection. For example, authentication element selection module 52 may select an authentication element from the set of authentication elements that is associated with a start time that is less than or equal to a current time. Because administrator 10 has configured copies of the set of authentication elements of router 30 at a second network device that shares the TCP connection, the second network device also stores the selected authentication element.

After selecting an authentication element, TCP module 50 uses security portion generation module 54 to generate a security portion for the TCP segment using a portion of the TCP segment and the selected authentication element. As discussed above, the security portion authenticates router 30 as the originator of the TCP segment. For example, security portion generation module 54 may generate a security portion by applying a hashing algorithm, such as MD5, associated with the selected authentication element to the portion of TCP data and a key associated with the selected authentication element. The portion of TCP data may include a TCP pseudo-header, a TCP header, and TCP segment data. In this case, the portion of TCP data may include the routing protocol data received from the routing protocol module.

For the example of TCP, security portion generation module 54 may calculate the security portion as a message authentication code (MAC) by applying the hashing algorithm to the following portions of TCP data in the order that they are listed: the TCP pseudo-header; the TCP header, including options, but with hash value set to zero for the purpose of computation and assuming a checksum of zero; the TCP segment data (if any). The pseudo-header defines how upper-level protocols, like TCP, compute their checksums. For instance, if network 8 uses Internet Protocol version four (IPv4), the pseudo-header includes a 32-bit source IP address, a 32-bit destination IP address, a zero-extended protocol number (to form 16 bits), and a 16-bit segment length. Note that this pseudo-header includes use of Internet Protocol version six (IPv6) via IPv4-mapped IPv6 addresses, in which case the source and destination IP addresses are from the IPv4 portions of the IPv6 source and destination addresses, respectively. On the other hand, if network 8 uses IPv6, the pseudo-header includes a 128-bit source IPv6 address, a 128-bit destination IPv6 address, a zero-extended next header value (to form 32 bits), and a 32-bit segment length.

Once security portion generation module 54 generates the security portion, TCP module 50 uses segment assembly module 56 to generate an authenticated TCP segment that includes the security portion and an authentication element identifier associated with the authentication element security portion generation module 52 used to generate the security portion. For example, segment assembly module 56 may generate the authenticated TCP segment by creating a TCP segment that includes a TCP Enhanced Authentication Option described above.

After segment assembly module 56 generates the authenticated TCP segment, a forwarding element 34 forwards the authenticated TCP segment to the second network device.

In addition to sending authenticated TCP segments, router 30 may use interface cards 38 to receive an authenticated TCP segment from a second network device through a TCP connection. This authenticated TCP segment may include routing protocol data for a protocol such as BGP. As before, the authenticated TCP segment includes a security portion and an authentication element identifier associated with one of a plurality of authentication elements stored on the sending device. In one embodiment, the authenticated TCP segment comprises a TCP option that includes the authentication element identifier and the security portion. Upon receiving the authenticated TCP segment, TCP module 50 uses authentication element selection module 52 to select an authentication element that is associated with the authentication element identifier in the authenticated TCP segment. In particular, authentication element selection module 52 selects the authentication element from the plurality of authentication elements associated with the TCP connection in authentication element repository 44.

After authentication element selection module 52 selects an authentication element, TCP module 50 uses security portion generation module 54 to generate a security portion for a portion of the TCP data in the TCP segment using the selected authentication element. For example, security portion generation module 54 may generate a security portion by calculating a MAC by applying a hashing algorithm associated with the selected authentication element to the portion of the TCP data and a key associated with the selected authentication element. As before, the portion of the TCP data may comprise a TCP pseudo-header of the TCP segment, a TCP header of the TCP segment, data of the TCP segment. TCP module 50 may also examine the T-bit from the incoming TCP option to determine whether incoming TCP options should be included in the MAC calculation.

Once security portion generation module 54 generates a security portion, e.g., a MAC, for the received authenticated TCP segment, TCP module 50 supplies the generated security portion and the security portion from the authenticated TCP segment to security portion comparison module 58. Security portion comparison module 58 accepts the authenticated TCP segment when the security portion generated by security portion generation module 54 matches the security portion received in the authenticated TCP segment.

Figure 4:
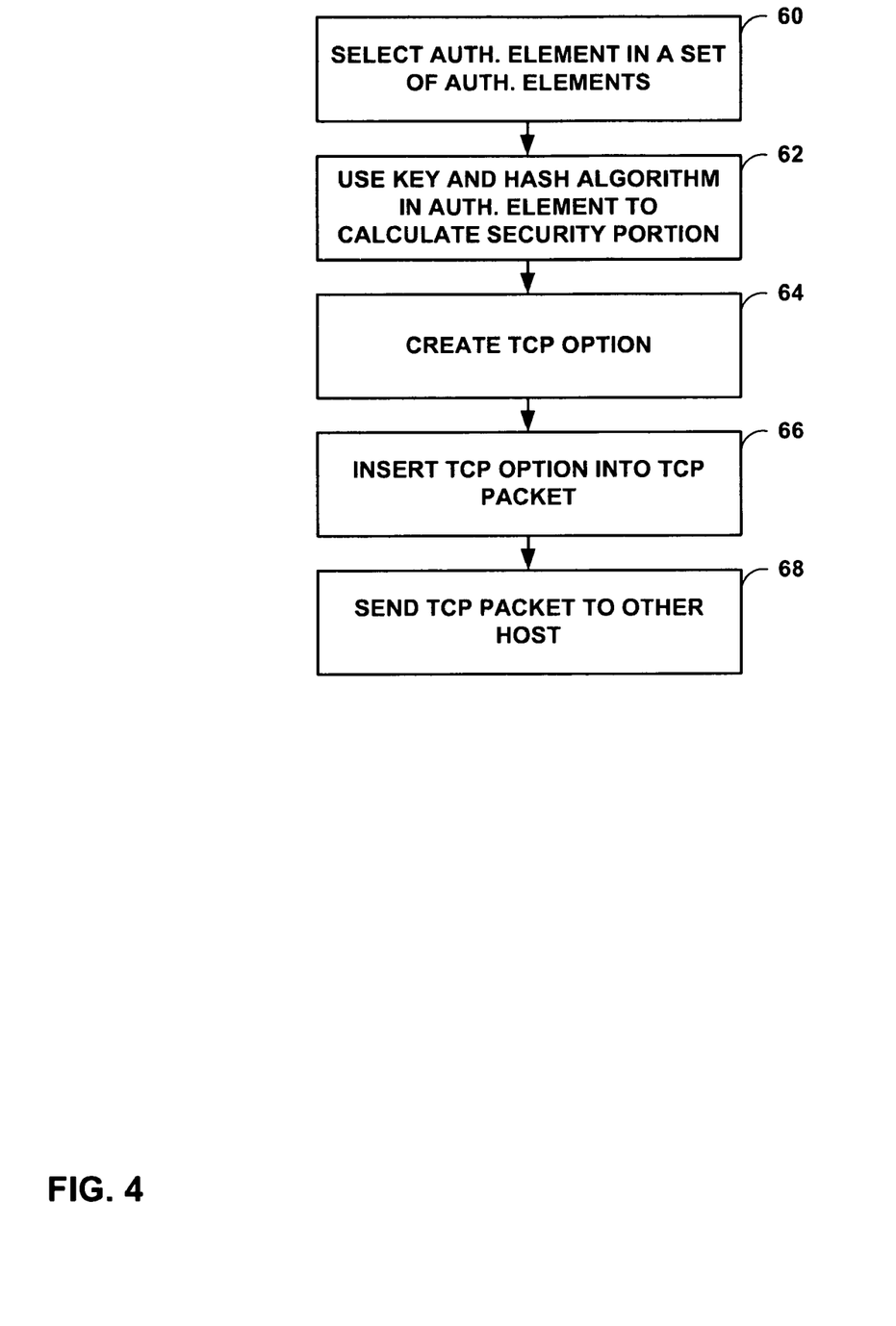
FIG. 4 is a flowchart illustrating an exemplary operation of a sending network device consistent with an embodiment of this invention.

FIG. 4 is a flowchart illustrating an exemplary operation of a sending network device consistent with an embodiment of this invention. For instance, network device 4 of FIG. 1 may act as the sending device and network device 6 may act as a receiving device. To send an authenticated TCP segment having a TCP Enhanced Authentication Option, network device 4 selects an authentication element from a set of authentication elements (60). For example, network device 4 may select an authentication element with the greatest start time where the current time is greater than the start time of the authentication element.

After selecting the authentication element, network device 4 uses a key and a hash algorithm specified in the selected authentication element to calculate a security portion for the packet (62). Next, network device 4 creates a TCP Enhanced Authentication Option (64). As discussed above, the TCP Enhanced Authentication Option includes a type field to identify the option as a TCP Enhanced Authentication Option, a length field to identify the length of the security portion, an authentication element identifier to identify the authentication element used to create the security portion, and the security portion itself. Network device 4 then inserts the TCP Enhanced Authentication Option into the authenticated TCP segment (66). Subsequently, network device 4 may send the authenticated TCP segment to network device 6 (68).

Figure 5:
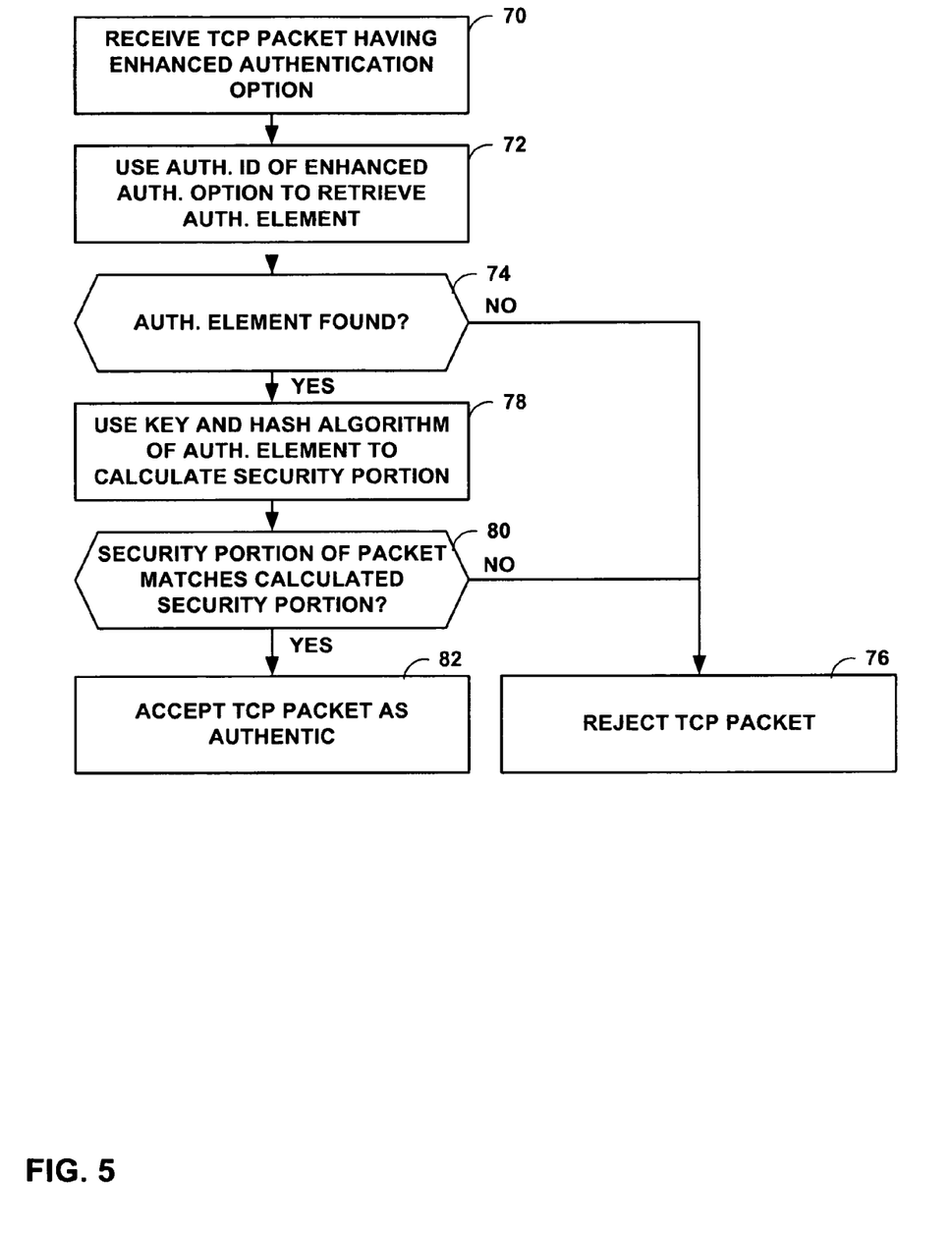
FIG. 5 is a flowchart illustrating an exemplary operation of a receiving network device consistent with an embodiment of this invention.

FIG. 5 is a flowchart illustrating an exemplary operation of a receiving network device consistent with an embodiment of this invention. For instance, network device 6 may act as the receiving device and network device 4 may act as a sending device. Initially, network device 6 receives an authenticated TCP segment that has a TCP Enhanced Authentication Option (70). Upon receiving the authenticated TCP segment, network device 6 uses the authentication element identifier of the TCP Enhanced Authentication Option to retrieve a copy of the corresponding authentication element from a set of stored authentication element copies (72). If network device 6 is not able to retrieve the identified authentication element ("NO" of 74), network device 6 rejects the TCP segment (76).

On the other hand, if network device 6 is able to retrieve the identified authentication element ("YES" of 74), network device 6 uses a key and a hashing algorithm of the retrieved authentication element to calculate a security portion, e.g., a MAC, for the TCP segment (78). Network device 6 then compares the calculated security portion to the security portion received in the TCP Enhanced Authentication Option (80). If the security portions do not match ("NO" of 80), network device 6 rejects the TCP segment. Otherwise, if the security portions match ("YES" of 80), network device 6 accepts the TCP segment as authentic (82).

Various embodiments of the invention have been described. For example, an embodiment using TCP to transport BGP data was described. Nevertheless, the principles of this invention may be applicable to protocols other than TCP and BGP. For instance, the principles of this invention may be applicable to networking protocols such as Internet Protocol version 4 (IPv4). In this instance, the TCP Enhanced Authentication Option may be replaced with an IPv4 option. Moreover, the principles of this invention are not limited to routing and management protocols. For example, an authenticated TCP segment may contain information in the Hypertext Transfer Protocol, Domain Name Server protocol, Session Initiation Protocol, Simple Network Management Protocol, File Transfer Protocol, and so on. These and other embodiments are within the scope of the following claims.

The invention claimed is:

1. A method comprising:
   storing, with a sending device, a plurality of authentication elements that each includes an identifier, a key, a security algorithm, and a start time representing when the respective authentication element is valid for calculating a security portion for a network segment of a network connection associated with the plurality of authentication elements, wherein at least one of the plurality of authentication elements has a start time that is greater than a current time;
   selecting one of the stored plurality of authentication elements that has a start time that is less than or equal to the current time for calculating the security portion for the network segment, wherein the sending device performs the selection of the one of the plurality of authentication elements;
   after selecting one of the stored plurality of authentication elements, generating with the sending device the security portion for the network segment associated with the network connection by applying the security algorithm and the key of the selected authentication element to at least a portion of the network segment; and
   outputting via the network connection the network segment to a receiving device, wherein the network segment includes the security portion for authenticating the sending device and the identifier of the selected authentication element used to calculate the security portion.

2. The method of claim 1, wherein the portion of the network segment comprises a pseudo-header of the network segment, a header of the network segment, and data of the network segment.

3. The method of claim 2, wherein the data of the network segment includes routing protocol data.

4. The method of claim 1, further comprising configuring the plurality of authentication elements without dismantling the network connection.

5. The method of claim 4,
   wherein configuring the plurality of authentication elements comprises adding a new authentication element to the plurality of authentication elements, and
   wherein the new authentication element has a start time greater than a current time.

6. The method of claim 1, further comprising:
   storing a copy of the plurality of authentication elements on the receiving device;
   receiving the network segment at the receiving device; and
   accepting the authenticated network segment with the receiving device when the security portion of the network segment matches a security portion generated by the receiving device using the copy of the authentication element identified by the identifier specified by the received segment.

7. The method of claim 1,
   wherein the security algorithms of the authentication elements are hash algorithms, and
   wherein generating a security portion comprises applying the hashing algorithm of the selected authentication element to a portion of the network segment and a key of the selected authentication element.

8. The method of claim 1, wherein a first one of the authentication elements includes a different security algorithm than a second one of the authentication elements.

9. The method of claim 1, wherein the security algorithm comprises Message-Digest Algorithm 5 (MD5) to produce the security portion as a cryptographic message digest.

10. The method of claim 1, wherein the network segment is a transmission control protocol (TCP) network segment, and wherein generating a security portion comprises generating a message authentication code (MAC).

11. The method of claim 1, wherein the network segment comprises an option that includes the authentication element identifier and the security portion.

12. The method of claim 1, wherein the sending device comprises a router.

13. The method of claim 1, wherein the network segment comprises routing protocol data.

14. The method of claim 1, wherein each of the authentication elements is a software object that includes the identifier, the key, the security algorithm, and the start time of the authentication element.

15. A method comprising:
storing within a receiving device a plurality of authentication elements for each of a plurality of protected network connections, wherein each authentication element includes an authentication element identifier, a key, a hash algorithm, and a start time, wherein at least one of the plurality of authentication elements has a start time that is greater than a current time;
receiving, with the receiving device, a network segment from a sending device through one of the protected network connections, wherein the network segment includes a security portion and an authentication element identifier;
using the authentication element identifier to select one of the authentication elements from the plurality of authentication elements associated with the protected network connection through which the network segment was received;
generating at the receiving device a second security portion for the network segment by applying the security algorithm and the key associated with the selected authentication element to a portion of the received network segment; and
accepting the network segment when the second security portion matches the security portion received in the network segment.

16. The method of claim 15, wherein the network segment comprises data in a routing protocol.

17. The method of claim 16, wherein the routing protocol is the Border Gateway Protocol.

18. The method of claim 15, further comprising configuring one or more of the plurality of authentication elements stored on the first device that are associated with an active one of the network connections other than a current authentication element for the active one of the network connections without dismantling the active one of the network connections.

19. The method of claim 18, wherein configuring the plurality of authentication elements comprises adding a new authentication element to the plurality of authentication elements.

20. The method of claim 15, wherein receiving a network segment comprises receiving a transmission control protocol (TCP) segment, and wherein generating a second security portion comprises generating a message authentication code (MAC).

21. The method of claim 15, wherein the portion of the network segment comprises a pseudo-header of the network segment, a header of the network segment, and data of the network segment.

22. The method of claim 15, wherein the network segment comprises an option that includes the authentication element identifier and the security portion.

23. The method of claim 15, wherein the sending device and the receiving device comprise routers.

24. The method of claim 15, wherein the security portion is sixteen octets in length.

25. The method of claim 15,
wherein each of the authentication elements is a software object that includes the identifier, the key, the security algorithm, and the start time of the authentication element, and
wherein the start time indicates when the respective authentication element is valid for authenticating segments in the respective network connection.

26. A network device comprising:
an authentication element repository to store a plurality of authentication elements for each of a plurality of protected network connections of a routing protocol, wherein each of the authentication elements is a software object that includes an authentication element identifier, a key, a hashing algorithm, and a start time indicating when the authentication element can be used for authenticating segments in the corresponding network connection, wherein at least one of the plurality of authentication elements has a start time that is greater than a current time;
an authentication element selection module to select an authentication element from the plurality of authentication elements in the authentication element repository associated with the network connection;
a security portion generation module to generate a security portion for a network segment by applying the hashing algorithm of the selected authentication element to a portion of the network segment and a key of the selected authentication element;
a segment assembly module to generate the network segment that includes the security portion and an authentication element identifier of the selected authentication element; and
a forwarding element to output the network segment generated by the segment assembly module to a receiving device.

27. The network device of claim 26, wherein the network segment is a transmission control protocol (TCP) network segment.

28. The network device of claim 26, wherein the authentication element selection module selects an authentication element from a subset of the plurality of authentication elements that have a start times that is less than or equal to a current time.

29. The network device of claim 26, wherein a first one of the authentication elements in the authentication element repository has a different hashing algorithm than a second one of the authentication elements in the authentication element repository.

30. The network device of claim 26, wherein an administrator is able to configure the plurality of authentication elements without dismantling the protected network connection.

31. The network device of claim 26, wherein the portion of the network segment comprises a TCP pseudo-header, a TCP header, and TCP segment data.

\* \* \* \* \*